United States Patent
Shetty et al.

(10) Patent No.: US 9,084,162 B2
(45) Date of Patent: Jul. 14, 2015

(54) FORCED DRX DURING AUTOMATIC NEIGHBOR RELATION (ANR) IN LTE

(75) Inventors: Manoj Shetty, Mumbai (IN); Debasish Sarkar, Irvine, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 232 days.

(21) Appl. No.: 13/613,074

(22) Filed: Sep. 13, 2012

(65) Prior Publication Data

US 2014/0073306 A1    Mar. 13, 2014

(51) Int. Cl.
  H04W 4/00    (2009.01)
  H04W 52/02   (2009.01)
  H04W 36/00   (2009.01)
  H04W 76/04   (2009.01)

(52) U.S. Cl.
  CPC ........ H04W 36/0088 (2013.01); H04W 76/048 (2013.01)

(58) Field of Classification Search
  CPC .................. H04W 36/0088; H04W 76/048
  USPC ........................................................ 455/418
  See application file for complete search history.

(56) References Cited

U.S. PATENT DOCUMENTS

| | | | |
|---|---|---|---|
| 2009/0264130 A1 | 10/2009 | Catovic et al. | |
| 2010/0142485 A1 | 6/2010 | Lee et al. | |
| 2010/0297955 A1* | 11/2010 | Marinier et al. | 455/73 |
| 2011/0263282 A1* | 10/2011 | Rune et al. | 455/507 |
| 2012/0051274 A1* | 3/2012 | Song | 370/311 |
| 2012/0263088 A1* | 10/2012 | Terry et al. | 370/311 |

FOREIGN PATENT DOCUMENTS

WO   WO 2012/042311 A1   4/2012

OTHER PUBLICATIONS

Ericsson, et al. Method for ANR Support in UTRAN. 3GPP Draft; R2-106442. Nov. 9, 2011.

* cited by examiner

*Primary Examiner* — Qun Shen (57) ABSTRACT

A method and mechanism to use a serving evolved Node B, eNB, to force a User Equipment, UE, (being served by that eNB) into Discontinuous Reception, DRX, mode despite pending data transactions at the UE. This results in timely reading of Extended Cell Global Identity, ECGI, of neighboring cell(s), thereby facilitating entry of a target cell into the serving cell's neighbor list via Automatic Neighbor Relation, ANR, and subsequent handover (if needed) to that target cell. The serving eNB may instruct its scheduler to not allocate any Resource Blocks, RBs, to the UE (especially when the UE has high volume of pending data transactions and/or when the UE is in motion and its retransmission rate is beyond a specific threshold) such that the UE automatically goes into the DRX mode. The duration of the DRX cycle also may be optionally extended until ECGI measurements from the UE are received.

17 Claims, 4 Drawing Sheets

FORCED DRX DURING AUTOMATIC NEIGHBOR RELATION (ANR) IN LTE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present invention generally relates to handover in wireless communication systems. More particularly, and not by way of limitation, particular embodiments of the present invention are directed to a system and method in which an evolved Node B (eNB) forces a User Equipment (UE) into the Discontinuous Reception (DRX) mode during an Automatic Neighbor Relation (ANR) procedure despite pending Uplink (UL) and/or Downlink (DL) data transactions at the UE.

BACKGROUND

In cellular communication, the most basic form of "handover" or "handoff" is when a phone call in progress is redirected from its current cell (called "source cell" or "serving cell") to a new cell (called "target cell"). In terrestrial cellular radio networks, the source and the target cells may be served from two different cell sites or from a single cell site (in the latter case, the two cells are usually referred to as two "sectors" on that cell site). Such a handover, in which the source and the target cells are different cells (even if they are no the same cell site) is called an inter-cell handover. The purpose of an inter-cell handover is to maintain the call as the subscriber is moving out of the area covered by the source cell and entering the area of the target cell.

In a Third Generation Partnership Project (3GPP) Long Term Evolution (LTE) network, the handover procedure starts with the measurement reporting of a handover event by the User Equipment (UE) to its serving evolved Node B (eNB or eNodeB) or Radio Base Station (RBS, or more simply "BS"). The UE periodically performs Downlink (DL) radio channel measurements based on the Reference Symbols (RS); namely, the UE can measure the Reference Symbols Received Power (RSRP) and the Reference Symbols Received Quality (RSRQ) from its serving cell as well as from the strongest adjacent cells in the system. If certain network-configured conditions are satisfied, the UE sends the corresponding measurement report (to its serving cell) indicating the triggered event. For example, when the handover (HO) algorithm is based on RSRP values, HO is triggered when the RSRP value from an adjacent cell is higher than the one from the serving cell by a network-specified number of decibels (dBs). In addition, the measurement report indicates the cell (referred to as "target cell") to which the UE has to be handed over. Based on the measurement reports, the serving eNB (in UE's source cell) starts HO preparation. The HO preparation includes exchanging of signaling between serving and target eNBs and admission control of the UE in the target cell. The communication interface between the serving and target eNBs is called the "X2" interface, which may be used to carry out necessary HO-related signaling. Upon successful HO preparation, the HO decision is made (by the source cell) and, consequently, the HO Command will be sent to the UE (from the source eNB). The UE may then attempt to synchronize and access the target eNB to effectuate the handover.

One of the most time-consuming tasks in today's cellular networks is the optimization of handover relations. The Automatic Neighbor Relation (ANR) feature in LTE minimizes the need for the manual configuration of neighbor cell list for intra-frequency or inter-frequency handover. ANR automatically builds up and maintains a neighbor list used for handover. ANR adds neighbor relations to the serving cell's neighbor list when the UE measurement reports indicate that a possible new neighbor relationship has been identified. When this occurs, the serving eNB (or RBS) requests the UE to report the unique Cell Global Identity (CGI) of the potential neighbor cell. Using this information, the serving RBS/eNB automatically creates a neighbor relation between the serving cell and the new neighbor cell using the ANR procedure, thereby facilitating UE's handover to that neighbor cell. The ANR feature can be used together with manual optimization of neighbor lists, and ANR is also able to automatically remove neighbor cell relations which have not been used within a particular time period.

Figure 1:
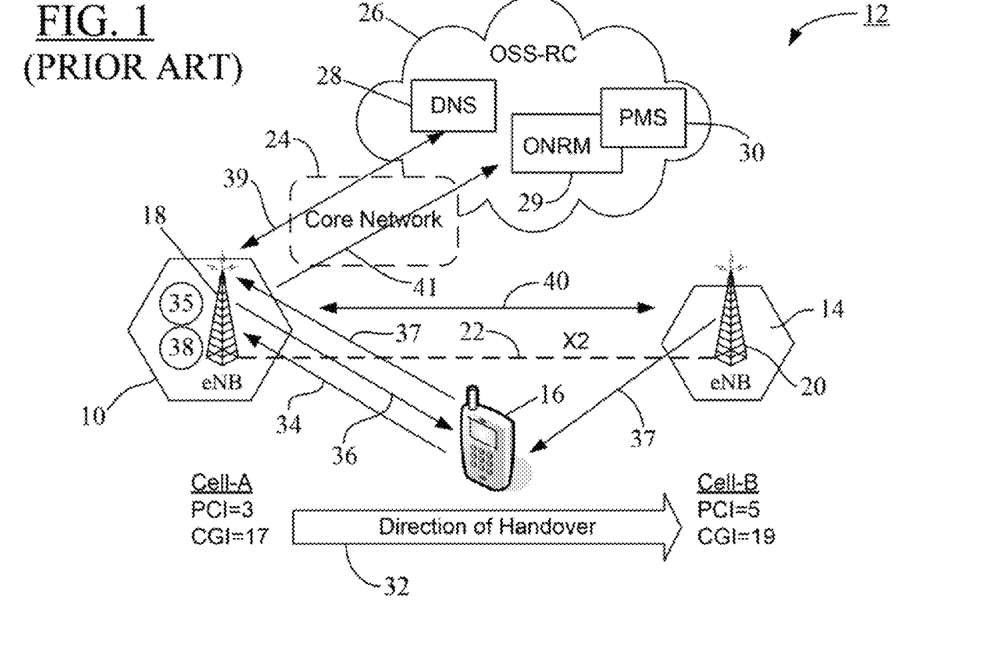
FIG. 1 illustrates an existing operational sequence as part of an Automatic Neighbor Relation (ANR) procedure in LTE to build a neighbor list at a serving cell in a wireless system for facilitating a future handover.

FIG. 1 illustrates an existing operational sequence as part of an Automatic Neighbor Relation (ANR) procedure in LTE to build a neighbor list at a serving cell 10 in a wireless system 12 for facilitating a future handover. For the sake of simplicity, only two cells—the serving cell 10 and a neighboring cell 14—are shown in FIG. 1 as part of the wireless system 12. It is understood that many such cells may form part of the system 12, and inter-cell handovers among those cells allow a UE (e.g., the UE 16) to "seamlessly" continue mobile communication throughout the system 12 and beyond. As mentioned earlier, the cells 10 and 14 may be part of different cell sites (not shown) or may belong to the same cell site (not shown). Furthermore, although cells 10 and 14 are illustrated far apart in FIG. 1 and although UE 16 is shown outside of both of these cells 10, 14, such illustration is for the sake of convenience and ease of discussion only. In the context of the handover related discussion with reference to FIG. 1, it is understood that the UE 16 may be physically present and operating (or registered) within the serving cell 10 or may be currently associated, with—i.e., under Radio Frequency (RF) coverage of—the serving cell 10 in some manner (e.g., through prior handover), but may need to be handed over to the neighboring/adjacent cell 14 if so determined by the eNB 18 associated with the serving cell 10 and providing RF coverage to the UE 16 within the serving cell 10. A different eNB 20 may be associated with the neighboring cell 14 to provide RF coverage over cell 14 and in its vicinity. The earlier-mentioned X2 communication interface between two eNBs 18, 20 is symbolically illustrated by dotted line 22. In the discussion below, the serving cell 10 may be interchangeably referred to as "Cell A" whereas the neighboring cell 14 may be interchangeably referred to as "Cell B."

As shown in FIG. 1, the wireless system 12 may also include a Core Network (CN) 24 through which the eNBs 18, 20 may communicate with an Operations Support System for Radio and Core (OSS-RC) 26. Although not shown explicitly, it is noted here that each eNB 18, 20 may be connected to the CN 24 and the OSS-RC 26. Furthermore, the OSS-RC also may be connected to the CN 24 and may provide a proprietary (network operator-specific) platform for supervision, configuration, deployment and optimization of a mobile or cellular network (e.g., the wireless system 12), with features tailored to promote efficient working procedures in daily network operations. The OSS-RC 26 may provide full support for management of fault, performance, and network configuration, and may also provide a number of new applications that may be used in the trouble-shooting and network optimization stages. The CN 24 may be an Evolved Packet Core (EPC) in LTE. In FIG. 1, the block showing the CN 24 is shown dotted to indicate lack of any appreciable involvement of the CN 24 (or its component nodes) during the ANR procedure or subsequent handover operation.

The OSS-RC 26 may be implemented using a combination of hardware and/or software modules. Some exemplary modules in the OSS-RC 26 are shown in FIG. 1. As illustrated, the OSS-RC 26 may include, among others, a Domain Name Server (DNS) module 28, an OSS-RC Network Resource Model (ONRM) 29, and a Performance Management Support (PMS) module 30. As mentioned below, the DNS module 28 may store and provide on request Internet Protocol (IP) address of a cell or other related information for the cell in the wireless system 12. The ONRM module 29 may store data and messages (e.g., alarm or non-alarm messages) from various network elements or nodes (e.g., an eNB or RBS, or a node in the core network) in the wireless system 12 and make its content available to other OSS-RC modules or system components (not shown) for efficient management of network performance and handling of fault events. The PMS module 30 may provide an interface (e.g., a Graphical User Interface or GUI) to manage performance of various network elements or nodes (e.g., an RBS, a Radio Network Controller (RNC), a node in the core network, etc.) in the wireless system 12. The PMS module 30 may allow a network operator or other authorized third party to set up and administer collection of performance management data from different portions (e.g., a Radio Access Network (RAN) portion) of the overall cellular network (e.g., an LTE network).

In FIG. 1, arrow 32 illustrates the exemplary direction of handover of the UE 16—i.e., from the serving cell (Cell A) 10 to the target cell (Cell B) 14. It is understood that similar handover may be performed from Cell B to Cell A (or between any other pair of cells in the system 12), when necessary. However, for ease of discussion, only the handover from Cell A to Cell B is addressed here. The operational sequence—performed prior to the handover—for building a neighbor list (not shown) at the serving cell 10 using the ANR procedure is illustrated using arrows or other indicators associated with reference numerals 34 through 41.

Figure 2:
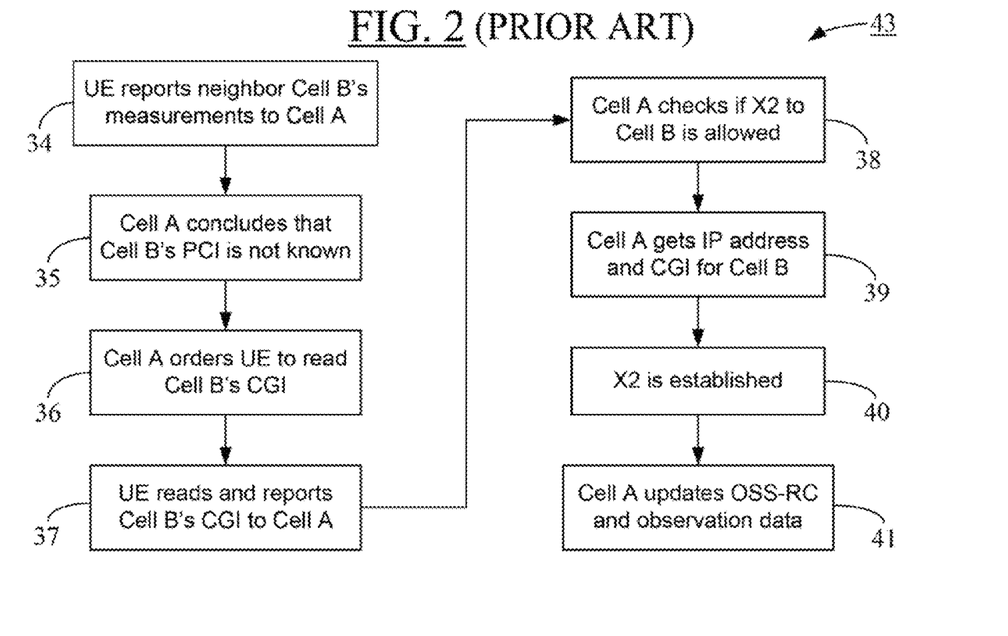
FIG. 2 shows a flowchart that provides details of each operation or step in the operational sequence illustrated in FIG. 1.

FIG. 2 shows a flowchart 43 that provides details of each operation or step in the operational sequence 34-41 illustrated in FIG. 1. Thus, for the sake of convenience and ease of understanding, identical reference numerals are used in FIGS. 1 and 2 for the operational sequence 34-41, and FIGS. 1 and 2 are jointly discussed below to explain what steps are performed to build a neighbor list at the serving cell 10 using ANR. It is assumed here that the Physical Cell ID (PCI) of Cell A has been assigned a value of "3", whereas the PCI of Cell B has been assigned a value of "5" as shown in FIG. 1. Similarly, it is also assumed that the Cell Global Identity (CGI) for Cell A has a value of "17," whereas the CGI for Cell B has been assigned a value of "19."

As is known, when the UE 16 is mobile, it may start receiving RF signals from the eNB 20 in the neighboring cell 14 along with the RF signals from its serving cell 10, especially when the UE 16 is in the vicinity of the neighboring cell 14. When the UE 16 receives RF signals from the neighboring cell (i.e., Cell B) 14, the UE 16 may initially report Cell B's signal measurements (as received by UE 16) to Cell A (as shown by arrow 34 in FIG. 1 and block 34 in FIG. 2). Such signal measurement may include, for example, the PCI of Cell B. Assuming Cell B is not on Cell A's current neighbor list, when Cell A receives PCI=5 (i.e., the PCI of Cell B) from the UE 16, Cell A may conclude that this PCI value is not known (as shown by circle 35 in FIG. 1 and block 35 in FIG. 2). Then, Cell A may order UE 16 to read CGI for Cell B (as shown by arrow 36 in FIG. 1 and block 36 in FIG. 2). In response, the UE 16 may read CGI broadcasted for Cell B and report that CGI to Cell A (as shown by arrow 37 in FIG. 1 and block 37 in FIG. 2). The UE 16 may also read and report RSRP and/or RSRQ values for the adjacent Cell B at step 37. Upon receiving Cell B's CGI, Cell A may automatically add (using ANR) Cell B as a neighbor cell in its neighbor list. Cell B's presence in Cell A's neighbor list would then allow Cell A to execute subsequent handover to Cell B, when needed.

Upon adding Cell B to its neighbor list, Cell A may check if X2 (i.e., communication interface) to Cell B is allowed (as shown by circle 38 in FIG. 1 and block 38 in FIG. 2). For example, there may be an "X2 Black List" stored in the source cell. If the target cell is not present in that "Black List," then the source cell would assume that X2 to that target cell is allowed. If X2 with Cell B is allowed, Cell A may get IP address and CGI for Cell B from the DNS module 28 in the OSS-RC 26 (as shown by arrow 39 in FIG. 1 and block 39 in FIG. 2). Thereafter, Cell A may establish X2 with Cell B as indicated by arrow 40 in FIG. 1 and block 40 in FIG. 2. After X2 is established with Cell B, Cell A may update OSS-RC 26 with relevant observation data (as indicated by arrow 41 in FIG. 1 and block 41 in FIG. 2). The "observation data" may include all the configuration information needed to setup the handover. Updating the OSS-RC 26 with this data may help all future handovers (from Cell A to Cell B) because the system now has all the information needed for a future handover request and it need not ask the UEs to read CGI information (for Cell B) every time (e.g., as indicated at block 36 in FIG. 2). It is noted here that in case of LTE's Evolved Universal Terrestrial Radio Access Network (EUTRAN) air interface, the term "CGI" may be replaced with the term "ECGI" referring to EUTRAN Cell Global Identity. In any event, the terms "CGI" and "ECGI" may be interchangeably used hereinbelow, and the mention of one term and absence of the other in the relevant discussion below should not be construed to mean that the discussion does not apply to the non-mentioned term. In other words, reference to "CGI" also includes "ECGI" (if applicable), and vice versa. Furthermore, alternative embodiments may utilize other identifiers in addition to or as an alternative to CGIs and ECGIs. In one embodiment, the "observation data" may include, for example, the IP address for the other (target) cell, the PCI for the target cell or sector (the serving cell and the target cell may be referred to as "sectors" when they both belong to the same cell site), etc.

The operational sequence 34-41 discussed above is part of the ANR procedure at the serving cell (i.e., Cell A) 10. Upon conclusion of the operational sequence 34-41, eNB 18 in Cell A may perform handover of UE 16 to eNB 20 in Cell B when certain network-specified triggers for HO are present (as mentioned earlier).

SUMMARY

Currently, when the serving cell orders a UE (e.g., the UE 16 in FIG. 1) to read a neighboring cell's CGI (as shown at block 36 in FIG. 2), the UE only performs the measurements (indicated at block 37) when the UE can itself create Discontinuous Reception (DRX) during the period of measurements. Generally speaking, DRX is a process when UE turns itself off when it does not expect to receive incoming data from the serving cell or has no outgoing data to be sent to the serving cell. DRX may be loosely referred to as the "sleep mode" and may be used to conserve UE's battery power. When the volume of pending data transmission and/or reception is low at the UE, the UE may itself enter into the DRX mode and perform the required measurements of the signals from the adjacent cell (e.g., CGI of the target cell, RSRP and/or RSRQ for the target cell, etc.). However, when the UE is actively performing full buffer data transfer—either in the UL or DL or both directions, the UE may not be able to use the DRX feature to "listen" to neighbor cells if it has active data running. Thus, the UE would not be able to read the target CGI (or ECGI) mentioned at step 36 in FIG. 2 in a timely manner, and, hence, no neighbor cells will be reported at block 37 (FIG. 2) to the serving cell in a timely manner. It is noted here that there should be at least one (1) second of no data activity (either in UL or DL) at the UE to trigger DRX at the UE, so as to eventually help the UE to read the target CGI needed for ANR. It is observed here that each UE may have different data buffer size based on UE's capability. Thus, a "high volume" or "full buffer" data transaction would refer to a situation in which the data buffer remains full all the time—i.e., a scheduler in the source cell always has data to send to the UE and/or the UE always has data to send to its source cell.

This behavior of the UE—i.e., UE's inability to carry out the required measurements—arises because the UE is not able to perform DRX due to data transfers/transactions pending at the UE. When the UE is not in DRX, it must listen for DL transmissions and/or feedback (e.g., Automatic Repeat reQuest (ARQ) or Hybrid Automatic Repeat request (HARQ) bits) related to its earlier UL transmissions. When listening for such other transmissions, the UE cannot read the ECGI of a neighboring cell. If the UE is unable to read the ECGI of a neighboring cell, the neighboring cell cannot be added to the neighbor list of the UE's serving cell via ANR. As a result, no handover can be performed to the neighboring cell, even though the neighboring cell may be better able to serve the UE.

By contrast, when the UE is in DRX mode (when data transmission is stopped), the UE is capable of reading the ECGI of target cells when instructed by the source cell through ANR. However, as discussed herein, UE can enter into DRX mode on its own depending on its "workload." But, from a serving eNB's point of view, such a conditional behavior could become unpredictable. Furthermore, holding a pending handover hostage to a UE's varying workload conditions may not be desirable. Currently, there is no capability in a cellular wireless network (e.g., an LTE network) to push the UE into DRX cycle.

Particular embodiments of the present disclosure thus provide for efficient and timely reading of CGI/ECGI of neighboring cells, thereby facilitating entry of a target cell into the serving cell's neighbor list via ANR without undue delay and also facilitating subsequent handover (if needed) to that target cell in a predictable manner. Methods and mechanisms of the present disclosure use the serving eNB to force the UE into DRX mode despite pending data transactions at the UE. In one embodiment, the serving eNB may implement a change wherein the serving eNB, while instructing the UE to read target CGI/ECGI, will also instruct the source scheduler in that eNB to not allocate any Resource Blocks (RBs) to the UE such that the UE automatically goes into DRX mode. This allows the UE to successfully read the CGI/ECGI of neighboring cells, which can then be added to the neighbor list of the UE's serving cell via ANR procedures. As a result, these neighboring cells may then be used as "target cells" for handover.

Another embodiment of the present disclosure relates to triggering point of DRX mode. In that embodiment, to perform the ECGI measurement for the ANR function, the DRX cycle is temporarily changed (by the source/serving eNB) to a long enough period—both in the UE and in the serving eNB—for the ECGI measurement. Once the ECGI measurement of the candidate neighboring cell is completed by the UE, it is sent (by the UE) in a measurement report to the source eNodeB. The source eNodeB then changes the DRX back to its "normal" value—both in the UE and in the source eNodeB.

In one embodiment, the present disclosure is directed to a method of updating a neighbor list at a serving cell in a wireless system, wherein an evolved Node B (eNB) in the wireless system provide Radio Frequency (RF) coverage to a User Equipment (UE) associated with the serving cell. The method comprises performing the following steps using the eNB: (i) instructing the UE to report a Cell Global Identity (CGI) of a neighboring cell in the wireless system from which RF signals are also received by the UE; (ii) forcing the UE to enter into a Discontinuous Reception (DRX) mode despite pending data transactions at the UE, thereby facilitating UE's timely reading of the CGI of the neighboring cell; (iii) receiving the CGI of the neighboring cell from the UE; and (iv) adding the neighboring cell to the neighbor list of the serving cell via an Automatic Neighbor Relation (ANR) procedure.

In another embodiment, the present disclosure is directed to a mobile communication node that is part of a wireless system and configured to perform the following: (i) provide RF coverage over a serving cell associated therewith; (ii) further provide RF coverage to a UE associated with the serving cell in the wireless system; (iii) instruct the UE to report a CGI of a neighboring cell in the wireless system from which RF signals are also received by the UE; (iv) force the UE to enter into a DRX mode despite pending data transactions at the UE; (v) receive the CGI of the neighboring cell from the UE; and (vi) add the neighboring cell to the neighbor list of the serving cell via an ANR procedure.

In a further embodiment, the present disclosure is directed to an improvement in a method of updating a neighbor list at a serving cell in a wireless system via an ANR procedure in which a UE associated with the serving cell is instructed by a Base Station (BS) of the serving cell to report a CGI of a neighboring cell in the wireless system to facilitate addition of the neighboring cell to the neighbor list of the serving cell. The improvement comprising the step of configuring the BS to force the UE to enter into a DRX mode despite pending data transactions at the UE, thereby facilitating UE's timely reading of the CGI of the neighboring cell.

In still another embodiment, the present disclosure is directed to a wireless system that comprises an evolved Node B (eNB) and a User Equipment (UE) that is in communication with the eNB. The eNB is configured to perform the following: (i) provide RF coverage over a serving cell associated with the eNB, (ii) further provide RF coverage to the UE associated with the serving cell in the wireless system, (iii) instruct the UE to report an Extended Cell Global Identity (ECGI) of a neighboring cell in the wireless system from which RF signals are also received by the UE, (iv) prevent allocation of Resource Blocks (RBs) to the UE in the Uplink (UL) and/or Downlink (DL) in response to instructing the UE to report the ECGI of the neighboring cell, thereby forcing the UE to enter into a DRX mode despite pending data transactions at the UE, (v) receive the ECGI of the neighboring cell from the UE, and (vi) add the neighboring cell to the neighbor list of the serving cell. The UE is configured to perform the following: (i) enter into the DRX mode despite pending data transactions at the UE, (ii) read the ECGI of the neighboring cell while in the DRX mode, and (iii) report the ECGI of the neighboring cell to the eNB.

By not scheduling RBs, and thereby pushing a UE in the DRX cycle, particular embodiments of the present disclosure provide for a better chance to add or remove a neighbor cell automatically (i.e., via ANR) even when a UE is downloading or uploading high volume of data. Not scheduling the packets either in DL or UL or both directions forces the UE to go into DRX mode, thereby helping the UE to read the ECGI of the neighbor cell. If there is constant scheduling of packets, the UE may never get an opportunity to read ECGI of the target cell, which may lead to a handover failure, resulting in weak throughput in UL or DL because of dropped calls (or data packets). However, UE's forced DRX entry and optional lengthening of the DRX cycle according to particular embodiments of the present disclosure can result in reduced call drop rate, thereby improving the overall customer perception of the operator's cellular service.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the disclosed invention may be practiced without these specific details. In other instances, well-known methods, procedures, components and circuits have not been described in detail so as not to obscure the present disclosure. Additionally, it should be understood that although the disclosure is described primarily in the context of a cellular telephone/data network, various embodiments of the described invention can be implemented in all wireless networks (cellular or non-cellular) that utilize handovers. Thus, the use of the term "cell"—as in the "serving cell" or the "target cell"—in the discussion below should not be construed to be limited to a cellular structure only. Rather, as mentioned above, the forced DRX approach discussed herein (or another approach similar in principle) may be used in other non-cellular networks as well.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "pre-determined," "operator-specific," etc.) may be occasionally interchangeably used with its non-hyphenated version (e.g., "predetermined," "operator specific," etc.), a capitalized entry (e.g., "Uplink") may be interchangeably used with its non-capitalized version (e.g., "uplink"), and plural terms may be indicated with or without an apostrophe (e.g., UE's or UEs, RB's or RBs). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

Figure 3:
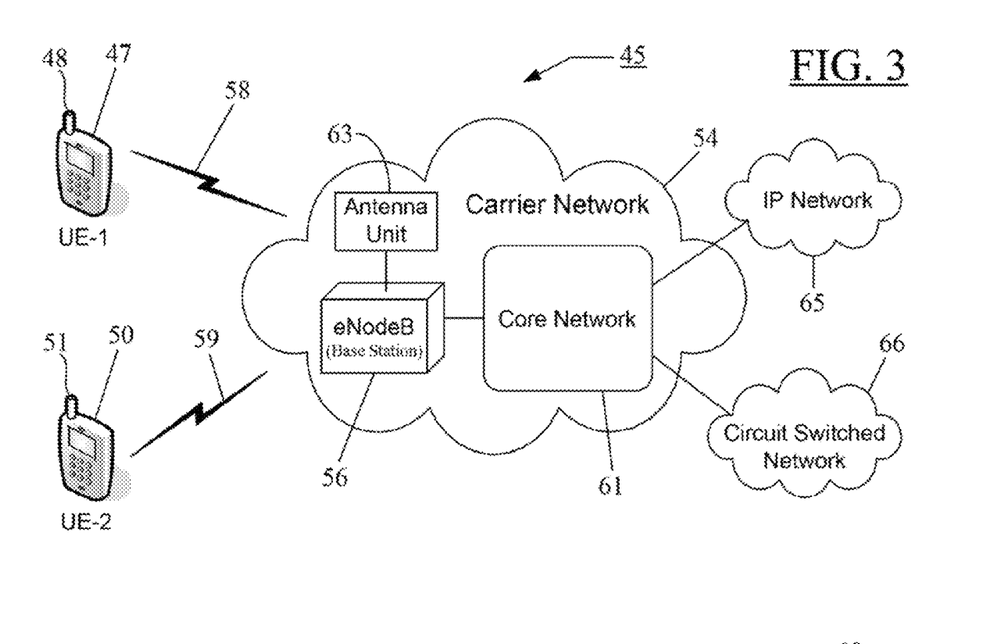
FIG. 3 is a diagram of an exemplary wireless system in which the forced DRX methodology according to the teachings of one embodiment of the present disclosure may be implemented.

FIG. 3 is a diagram of an exemplary wireless system 45 in which the forced DRX methodology according to the teachings of one embodiment of the present disclosure may be implemented. The system 45 may include a plurality of mobile handsets; two of which are shown in FIG. 3 and identified by reference numerals 47 and 50. Each mobile handset 47, 50 may include a corresponding antenna unit 48, 51. The mobile handsets 47, 50 are shown to be in wireless communication with a carrier network 54 of a wireless service provider (or operator) through a wireless access (or mobile communication) node 56 of the carrier network 54. The access node or mobile communication node 56 may be, for example, a base station (BS) in a Third Generation (3G) network, or an evolved Node-B (eNodeB) when the carrier network 54 is a Long-Term Evolution (LTE) network, or a home base station or femtocell, and may provide radio interface to the mobile handsets 47, 50. In other embodiments, the communication node 56 may also include a site controller, an access point (AP), a radio tower, or any other type of radio interface device capable of operating in a wireless environment. It is noted here that the terms "mobile handset," "wireless handset," "wireless device," "terminal," and "User Equipment (UE)" may be used interchangeably herein to refer to a wireless communication device that is capable of voice and/or data communication via a wireless carrier network and also capable of being mobile. Some examples of such mobile handsets/devices include cellular telephones or data transfer equipments (e.g., a Personal Digital Assistant (PDA) or a pager), smartphones (e.g., iPhone™, Android™, Blackberry™, etc.), computers, Bluetooth® devices, or any other type of user devices capable of operating in a wireless environment. Similarly, the terms "wireless network" or "carrier network" may be used interchangeably herein to refer to a wireless communication network (e.g., a cellular network) facilitating voice and/or data communication between two user equipments (UEs).

In the wireless system of FIG. 3, the BS or eNodeB 56 may be configured to implement the eNB-related steps outlined in the flowcharts in FIGS. 4 and 5 (which are discussed later below). In addition to providing air interface or communication channel (e.g., as represented by wireless links 58-59 in FIG. 3) to the UEs 47, 50 via an antenna unit 63, the access node 56 may also perform radio resource management (as, for example, in case of an eNodeB in an LTE system) using, for example, channel feedbacks received from the UEs 47, 50 operating in the network 54. The communication channel (e.g., a Radio Frequency (RF) channel) between the base station and the wireless terminals may provide a conduit for the signals exchanged between the base station 56 and UEs 47, 50. The eNB antenna unit 63 may include two or more antennas (not shown individually) to support simultaneous multiple transmissions/receptions of signals to/from multiple UEs 47, 50.

It is noted here that when the wireless system 45 is a cellular system (like the system 12 shown in FIG. 1), the eNB 56 may be associated with a particular cell (not shown) and may provide RF coverage to UEs 47, 50 as their serving eNB. The UEs 47, 50 may be served by the eNB 56 because they may be physically present, registered, associated with (e.g., through RF coverage or prior handover), or operating within the eNB's 56 cell. In the discussion herein, the eNB 56 is considered as the "serving" or "source" eNB (like the eNB 18 in FIG. 1, but having additional functionality according to the teachings of the present disclosure). A corresponding target eNB (like the eNB 20 in FIG. 1) and target cell (like the cell 14 in FIG. 1) are not shown in FIG. 3 for the sake of clarity because the focus in the discussion below is primarily on the actions performed by the source eNB 56. Similarly, the wireless system 45 may also include an OSS-RC (like the OSS-RC 26 shown in FIG. 1) connected to the base station 56 (and other base stations in the system 45) and the core network 61 (discussed below). However, such OSS-RC is also not shown in FIG. 3 for the sake of simplicity of the drawing and because of lack of relevance of OSS-RC to the discussion presented below.

Although various examples in the discussion below are provided primarily in the context of an LTE network, the teachings of the present disclosure may equally apply, with suitable modifications (as may be apparent to one skilled in the art using the present teachings), to a number of different Frequency Division Multiplex (FDM) or Time Division Multiplex (TDM) based wireless systems or networks that may support handovers of mobile handsets. Such networks or systems may include, for example, standard-based systems/networks using Second Generation (2G), Third Generation (3G), or Fourth Generation (4G) specifications, or non-standard based systems. Some examples of such systems or networks include, but not limited to, Global System for Mobile communications (GSM) networks, Telecommunications Industry Association/Electronic Industries Alliance (TIA/EIA) Interim Standard-136 (IS-136) based Time Division Multiple Access (TDMA) systems, Wideband Code Division Multiple Access (WCDMA) systems, 3GPP LTE networks, WCDMA-based High Speed Packet Access (HSPA) systems, 3GPP2's CDMA based High Rate Packet Data (HRPD) systems, CDMA2000 or TIA/EIA IS-2000 systems, Evolution-Data Optimized (EV-DO) systems, Worldwide Interoperability for Microwave Access (WiMAX) systems based on Institute of Electrical and Electronics Engineers (IEEE) standard IEEE 802.16e, International Mobile Telecommunications-Advanced (IMT-Advanced) systems (e.g., LTE Advanced systems), other Universal Terrestrial Radio Access Networks (UTRAN) or Evolved-UTRAN (E-UTRAN) networks, GSM/Enhanced Data Rate for GSM Evolution (GSM/EDGE) systems, a non-standard based proprietary corporate wireless network, etc.

Referring again to FIG. 3, in case of a 3G carrier network 54, the communication node 56 may include functionalities of a 3G base station (or RBS) along with some or all functionalities of a 3G Radio Network Controller (RNC), and may be configured to provide forced DRX as discussed hereinbelow. Communication nodes in other types of carrier networks (e.g., 2G networks, or 4G networks and beyond) also may be configured similarly. In one embodiment, the node 56 may be configured (in hardware, via software, or both) to implement the forced DRX approach as per teachings of the present disclosure. For example, when existing hardware architecture of the access node 56 cannot be modified, the forced DRX methodology according to one embodiment of the present disclosure may be implemented through suitable programming of one or more processors (e.g., processor 110 (or, more particularly, processing unit 115) in FIG. 7) in the access node 56 or a Base Station Controller (BSC) (if available). The execution of the program code (by a processor in the node 56) may cause the processor to perform the eNB-related steps outlined in FIGS. 4 and 5 and discussed later herein. Similarly, one or more of the UE's 47, 50 may be suitably configured (in hardware and/or software) to enable the UE to "understand" message(s) received from its RBS/eNB 56 when that RBS is implementing forced DRX as per the teachings of the present disclosure. In one embodiment, the eNB 56 may include a handover determination module (as shown by way of example in FIG. 7 and discussed later hereinbelow). This module (preferably implemented in software) may be configured according to the teachings of the present disclosure to support the forced DRX approach discussed later below. Thus, in the discussion below, although a communication unit—whether the communication node 56 (or its BSC) or any of the UEs 47, 50—may be referred to as "performing," "accomplishing," or "carrying out" a function or process, it is evident to one skilled in the art that such performance may be technically accomplished in hardware and/or software as desired.

The carrier network 54 may include a Core Network (CN) 61 coupled to the communication node 56 and providing logical and control functions (e.g., subscriber account management, billing, subscriber mobility management, etc.) in the network 54. In case of an LTE carrier network, the core network 61 may be an Access Gateway (AGW) or may function in conjunction with a subnet-specific gateway/control node (not shown in FIG. 3). Regardless of the type of carrier network 54, the core network 61 may function to provide connection of one or more of the UEs 47, 50 to other mobile handsets operating in the carrier network 54 and also to other communication devices (e.g., wireline or wireless phones) or resources (e.g., an Internet website) in other voice and/or data networks external to the carrier network 54. In that regard, the core network 61 may be coupled to a packet-switched network 65 (e.g., an Internet Protocol (IP) network such as the Internet) as well as a circuit-switched network 66 such as the Public-Switched Telephone Network (PSTN) to accomplish the desired connections beyond the devices operating in the carrier network 54. Thus, through the communication node's 56 connection to the core network 54 and a handset's radio link with the communication node 56, a user of the handset (e.g., UE 47 or 50) may wirelessly (and seamlessly) access many different resources or systems beyond those operating within the carrier network 54 of an operator.

As is understood, the carrier network 54 may be a cellular telephone network or a Public Land Mobile Network (PLMN) in which the UE's 47, 50 may be subscriber units. However, as mentioned before, the present invention is operable in other non-cellular wireless networks as well (whether voice networks, data networks, or both). Furthermore, portions of the carrier network 54 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 54 may be connected to the Internet via its core network's 61 connection to the IP (packet-switched) network 65 or may include a portion of the Internet as part thereof. In one embodiment, a network may include more or less or different type of functional entities than those shown in the context of carrier network 54 in FIG. 3.

Figure 4:
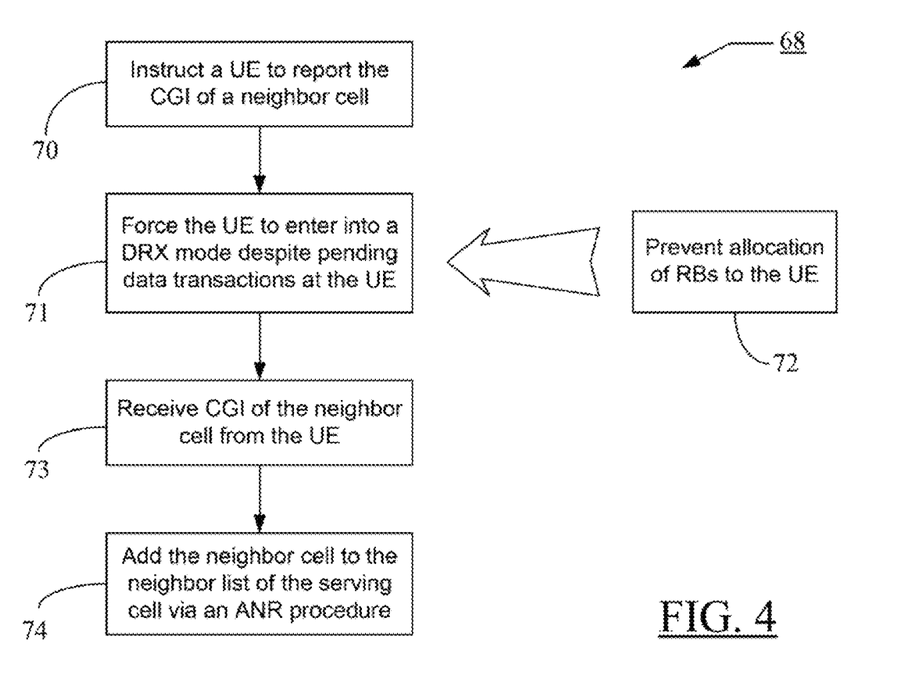
FIG. 4 is an exemplary flowchart depicting steps that may be performed by an eNB to accomplish forced DRX in a UE according to one embodiment of the present disclosure.

FIG. 4 is an exemplary flowchart 68 depicting steps that may be performed by an eNB (e.g., the eNB 56) to accomplish forced DRX in a UE (e.g., one of the UEs 47, 50) according to one embodiment of the present disclosure. The eNB 56 may be the serving eNB of the UE and may initiate an ANR procedure—e.g., based on a measurement report from the UE containing RSRQ and/or RSRP values for an adjacent cell other than the serving cell—to automatically build up or maintain a neighbor list (not shown) at the eNB 56 containing information about the UE-reported "new" neighboring cell (not shown) of the serving cell (associated with the eNB 56) (not shown). As is known, this neighboring cell may be a candidate "target cell" when handover of the UE is to be carried out. Initially, as part of the ANR procedure, the eNB 56 may instruct the UE (e.g., the UE 50) to report the CGI/ECGI of the neighbor cell (block 70 in FIG. 4). This step may be similar to step 36 discussed earlier with reference to FIG. 2. However, instead of waiting for the UE's pending data transactions (in UL and/or DL) to conclude so that UE can itself enter into the DRX mode, the eNB 56 according to one embodiment of the present disclosure would force the UE 50 to enter into the DRX mode despite pending data transactions at the UE (block 71). In one embodiment, the eNB 56 may prevent allocation of Resource Blocks (RBs) to the UE to force the UE to enter into the DRX mode (block 72). As mentioned earlier, the eNB 56 may instruct its scheduler (shown in FIG. 7) not to schedule any RBs or packets in the UL or DL or both directions to force the UE to go into DRX mode. In an alternative embodiment, the eNB 56 may prevent allocation of RBs to the UE until the CGI/ECGI of the neighboring cell is received from the UE. Upon entering the DRX mode, the UE 50 may read and report the CGI/ECGI of the neighbor cell to the eNB 56. When the eNB 56 receives the CGI/ECGI of the neighbor cell from the UE (block 73), the eNB 56 may add the neighbor cell to the neighbor list of the serving cell (associated with the eNB 56) via the ANR procedure (block 74).

Figure 5:
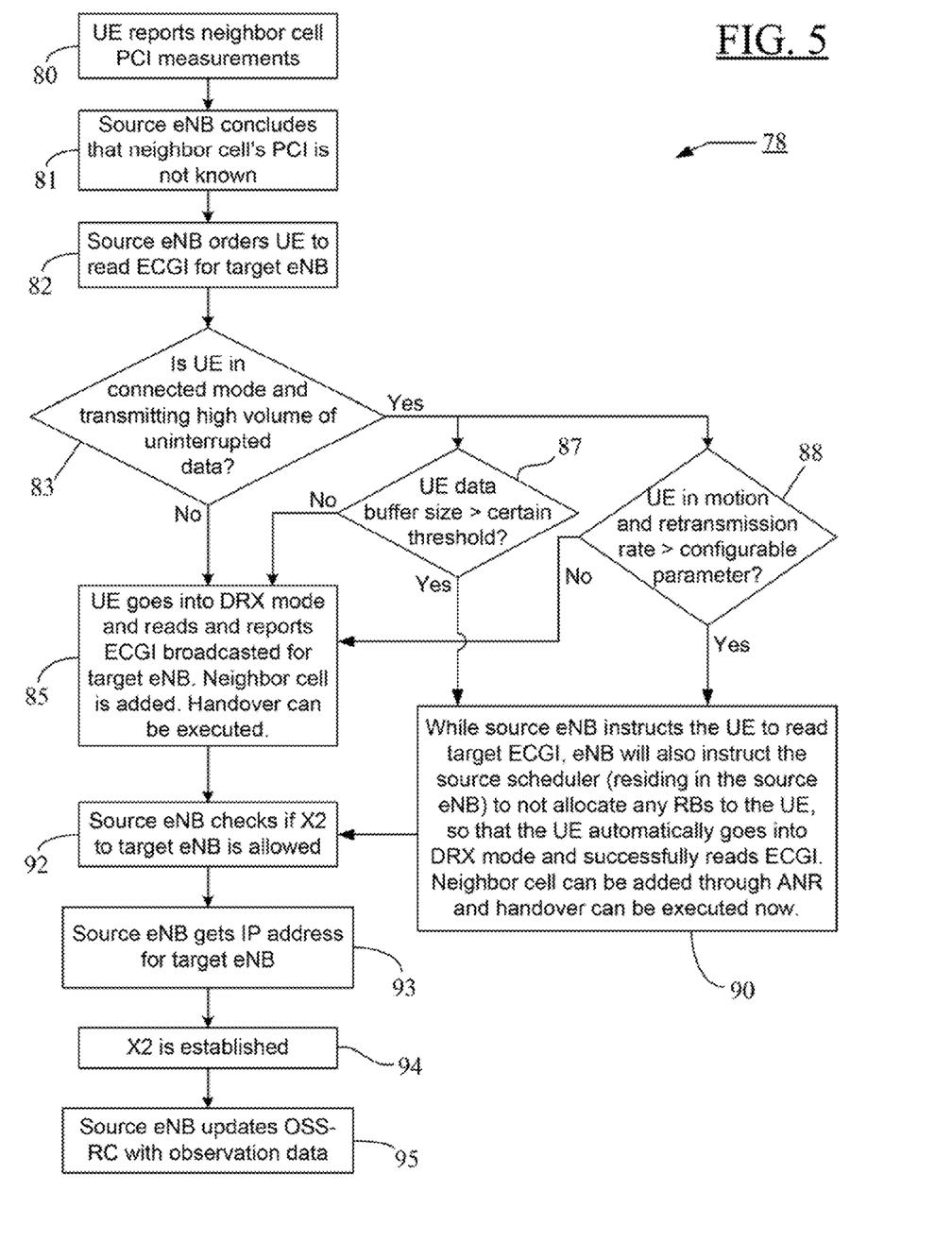
FIG. 5 is an exemplary flowchart illustrating details of the forced DRX mechanism according to particular embodiments of the present disclosure.

FIG. 5 is an exemplary flowchart 77 illustrating details of the forced DRX mechanism according to particular embodiments of the present disclosure. The general outline provided in FIG. 4 is elaborated further in FIG. 5 in the context of two situations discussed later below: (i) when the UE has high volume of pending data transactions, and (ii) when the UE is in motion. It is noted here that the steps in the flowchart in FIG. 5 may be specific to the system configuration shown in FIG. 3 and may be implemented using the eNB 56 (as the serving or source eNB) and the UE 50 (which, for example, may be performing UE-specific steps in FIG. 5) in the wireless system 45. Thus, although the steps 80-82, 85 and 92-95 in FIG. 5 are not discussed in any appreciable detail because they are similar to respective steps 34-41 discussed earlier with reference to FIGS. 1 and 2, it does not imply that the methodology in FIG. 5 may be implemented using the eNB 18 and UE 16 in FIG. 1. Rather, as mentioned, the eNB 56 and UE 50 pair in system 45 may be specifically configured to implement the forced DRX mechanism outlined in FIGS. 4-5. It is understood that, like UE 50, the UE 47 (or any other UE in the RF coverage of the source eNB 56 in the system 45) also may be forced into DRX mode by the eNB 56. However, for the sake of discussion, only UE 50 is used as an example.

Prior to continuing discussion of FIG. 5, it is observed here that FIG. 2 described actions performed by a source cell (i.e., Cell A 10 in FIG. 1) whereas FIG. 5 describes actions performed by a source eNB (i.e., eNB 56 in FIG. 3). However, it is understood that it is an eNB associated with a cell that actually performs the relevant acts discussed with reference to FIGS. 2 and 5. In other words, in the discussion herein, a cell's and its eNB's actions/properties may be interchangeably described for the sake of convenience only; in practice, it is the eNB (providing RF coverage and other radio signal processing for the cell) that performs the described actions or possesses the described properties. Furthermore, as mentioned earlier, the terms "CGI" and "ECGI" may be used interchangeably herein. In other words, reference to "CGI" also includes "ECGI" (if applicable), and vice versa.

Referring now to FIG. 5, initially, the UE 50 may report PCI measurements of the neighbor cell (not shown) to its serving eNB 56 (block 80). Because this neighbor cell may not be present in the source cell's/eNB's neighbor list, the source eNB (i.e., eNB 56) may conclude that the UE-reported neighbor cell's PCI is not known (block 81). As a result, at block 82, the source eNB 56 may order the UE 50 to read ECGI/CGI for target eNB (i.e., the eNB associated with the target cell and providing RF coverage over the target cell) (not shown). Thereafter, decision block 83 evaluates whether the UE 50 is connected to its source eNB 56 (i.e., whether the UE is in communication with the source eNB) and transmitting high volume of uninterrupted data in the UL (or has high volume of uninterrupted data to be received from the eNB in the DL). As mentioned earlier and indicated at block 85, in one embodiment, if the UE 50 has a low volume of pending data transmission and/or reception, then the UE may itself enter into the DRX mode (after quick conclusion of its pending low-volume data transactions), without being forced into DRX mode by the eNB 56. Thereafter, the UE may perform the required measurements of the signals from the target eNB (e.g., ECGI of the target eNB, RSRP and/or RSRQ for the target eNB, etc.). The neighbor cell (or "target cell") is then added to the source eNB's 56 neighbor list through ANR, and handover (when needed) can be executed to this newly-added neighbor cell (once X2 is established with the neighbor cell's eNB as indicated by blocks 92-95 in FIG. 5).

However, when the UE 50 is connected to its source eNB 56 and actively performing full buffer (high volume) uninterrupted data transfer—either in the UL or DL or both directions, the UE may not be able to use the self-DRX option to timely "listen" to neighbor cells if it has active data running. In this situation, the decision block 83 may return a "yes"

result, prompting evaluations at blocks 87-88 and forced DRX at block 90 when either or both of the evaluations at blocks 87-88 are positive. In one embodiment, the term "high volume" (as in "high volume data transactions" or "high volume data transfers") may refer to that volume of pending data transactions which would unreasonably delay UE's entry into DRX mode on its own, thereby requiring the source eNB to force the UE into the DRX mode as per teachings of the present disclosure so as to timely obtain ECGI/CGI of target cells as part of its ANR procedure to build the neighbor list.

As mentioned earlier, particular embodiments of the present disclosure provide a solution where the source eNB (e.g., the eNB 56 in FIG. 3), while instructing the UE (e.g., the UE 50) to read target ECGI (block 82 in FIG. 5), will also instruct the source scheduler residing in the eNB 56 (e.g., the scheduler 120 shown in FIG. 7) to not allocate any RBs to the UE (in the UL, DL, or both) such that the UE automatically goes into DRX mode and successfully reads ECGI of neighboring cells, as shown at block 90 in FIG. 5. The UE 50 can then report the ECGI to the eNB 56, which can then use the information to update its neighbor list through ANR procedures. These neighboring cells can then be used as potential targets for handover. As illustrated in the embodiment of FIG. 5, the eNB 56 may decide whether to schedule or not schedule RBs during ECGI request (block 90) based on whether either or both of the following two conditions are satisfied: (i) When the UE 50 has high volume of pending data transactions—i.e., when the eNB 56 determines that the pending data (to be transmitted or received) in the UE's data buffer (not shown) is beyond a certain predetermined (or configurable) threshold value (decision block 87 in FIG. 5). (ii) When the eNB 56 determines that the UE 50 is in motion and UE's retransmission rate is greater than a configurable parameter (or threshold) (decision block 88 in FIG. 5).

As part of the determination at block 87, it is observed that if the volume of data remaining to be transmitted (or received) by the UE 50 is very high (e.g., when the data buffer size required for such data transaction exceeds a configurable parameter or threshold), then the eNB 56 may determine that the UE 50 should be forced to go into the DRX mode. (The earlier-mentioned terms such as "high volume" or "full buffer" (or terms having similar import) refer to such active data transfers from the UE 50.) In one embodiment, the configurable parameter or threshold could be, for example, 500 KB. On the other hand, if only few bits are left to be sent/received, then it would be preferable for the UE 50 to send/receive the remaining bits through its current (source) eNB 56 rather than through handover to another (target) eNB. In the latter case, the eNB 56 may not adjust its scheduling procedure to initiate/force DRX in the UE (as indicated by block 87 leading to block 85 in FIG. 5 when the determination at block 87 is in the negative), and the ongoing transmission/reception (by the UE 50) may continue as normal. Thus, in one embodiment (e.g., the embodiment shown in FIG. 4), the eNB 56 may perform forced DRX regardless of the volume of pending data transactions (transmissions and/or receptions) at the UE 50. However, in another embodiment (e.g., the embodiment shown in FIG. 5), the eNB 56 may perform forced DRX depending on the volume of pending data transactions at the UE 50.

In case of the determination at block 88, if the eNB 56 determines that the UE 50 is in motion and UE's retransmission rate is higher than a configurable parameter (which may be operator-specific), then the eNB 56 may instruct its scheduler (e.g., the scheduler 120 in FIG. 7) not to allocate any RBs to the UE 50, thereby forcing the UE 50 to go into the DRX mode (block 90 in FIG. 5). For example, forced DRX may be initiated when the retransmission rate is greater than 10%. In one embodiment, the eNB 56 may determine that the UE 50 is in motion based on the evaluation of the measurement reports received from the UE 50 at block 80 (FIG. 5). For example, if the UE 50 reports a given number (which may be operator-specific) of unique best cell PCI's (i.e., PCI's of those adjacent/neighboring cells from which UE 50 receives good radio receptions) in a certain time frame (e.g., more than 2 PCI's in less than 200 ms) and if RSRP of the source cell (i.e., source cell associated with the source eNB 56) is changing very rapidly (as reported in UE's measurement reports sent to the eNB 56), the eNB 56 can conclude that UE 50 is in motion. Moreover, if Global Positioning System (GPS) is enabled in the UE 50, then it may be easily determined whether the UE is in motion or not. In case of a GPS-enabled UE, even the speed of the UE may be ascertained as well.

The term "retransmission rate" refers to how many packets have to be retransmitted by the UE 50 (or to the UE 50) compared to the total transmitted data. The number of retransmitted packets may be measured at the Physical layer or at the Radio Link Control (RLC) layer between the eNB 56 and the UE 50—for example, through the HARQ process using Non-ACKnowledgement or Negative ACKnowledgement (NACK) message(s) on the Physical layer or ARQ message(s) on the RLC layer. The NACK and ARQ messages are basically a measure of the radio condition between the eNB 56 and the UE 50. A higher-than-usual number of NACK and ARQ messages may imply high retransmission rate due to poor or deteriorating radio condition between the eNB 56 and the UE 50, thereby indicating that the UE 50 badly needs a handover. Higher retransmission rate also means that Block Error Rate (BLER) is high and the UE 50 and/or the eNB 56 is unable to receive/decode the packets correctly.

In LTE, for example, there are certain "events" that function as triggers for various RF conditions. One example of such event/trigger involves RF condition of the serving cell. For example, as soon as the strength of the serving cell's RF signals falls below a certain threshold, a UE (e.g., the UE 50) may automatically search for a neighboring cell in anticipation of good RF signals. As soon as RF signals from a neighbor cell (or "detected cell") becomes better than a certain threshold, the UE 50 may send the neighbor cell's RF information to its serving cell (i.e., serving eNB 56) in a report called "Measurement Report." The measurement reports at block 80 in FIG. 5 (and also at block 34 in FIG. 2) also indicate such information to the serving cell, so that the serving eNB 56 becomes aware of the "detected" neighbor cell(s). In LTE, for example, the triggers and thresholds for various "events" may be provided to a UE in the form of System Information (SI) and the UE may then constantly check for the triggers irrespective of its DRX state.

In one embodiment, based on the measurement report from the UE 50, the eNB 56 can check if the detected neighbor cell is very strong (i.e., RF signals from this neighbor cell are strongly received at the UE 50) and can only then instruct the UE 50 to go into DRX. On the other hand, if the detected neighbor cell is not strong (i.e., strength of the neighbor cell's RF signals—as received at the UE 50—is not above a predetermined threshold), then the eNB 56 may decide not to handover the UE to that detected cell, but rather drag the call through the eNB 56 and send as much data as possible from the source eNB (i.e., eNB 56) itself even if the UE 50 is in motion and its retransmission rate is higher.

After the ECGI value for the target eNB (not shown) is received from the UE 50 (whether at block 85 or through forced DRX at block 90 in FIG. 5), the source eNB 56 may check (in the manner similar to that discussed earlier with reference to block 38 in FIG. 2) if X2 to the UE-reported target eNB is allowed (block 92 in FIG. 5). If X2 to the target eNB is allowed, the source eNB 56 may get IP address for the target eNB (e.g., from a DNS module in the OSS-RC for the carrier network 54—i.e., in a manner similar to that discussed with reference to block 39 in FIG. 2) as indicated at block 93 in FIG. 5. Once the X2 interface is established between the source eNB 56 and the target eNB (block 94 in FIG. 5), the source eNB 56 may update its associated OSS-RC with relevant observation data (block 95 in FIG. 5) in a manner similar to that described earlier with reference to block 41 in FIG. 2. As also noted there, the "observation data" may include all the configuration information needed to setup the handover.

In one embodiment, as mentioned earlier, the triggering point of the DRX mode may be extended as well. In other words, to allow the UE 50 to perform the ECGI measurement (blocks 85 or 90 in FIG. 5, as applicable) for the ANR function, the DRX cycle duration may be temporarily changed by the eNB 56 (e.g., using parameters which control the active and sleep duration of the DRX cycle)—both in the UE 50 and in the eNB 56—to a long enough period for the ECGI measurement to conclude. Once the ECGI measurement of the candidate neighboring cell is completed (by the UE 50) and the measurement is received at the source eNB 56 via a measurement report from the UE 50, the eNB 56 may then change the duration of the DRX cycle back to its "normal" value—both in the UE 50 and in the eNB 56.

Figure 6:
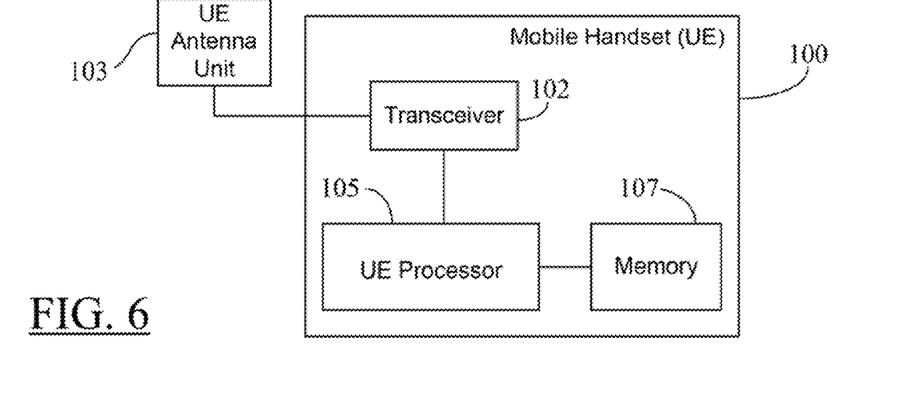
FIG. 6 is a block diagram of an exemplary mobile handset or UE according to one embodiment of the present disclosure.

FIG. 6 is a block diagram of an exemplary mobile handset or UE 100 according to one embodiment of the present disclosure. The UE 100 may represent either of the UE's 47 and 50 in FIG. 3, and may be configured to assist an RBS/eNB (e.g., the eNB 56 in FIG. 3) in implementing the forced DRX mechanism discussed earlier in conjunction with FIGS. 4-5. As shown in FIG. 6, the UE or mobile device 100 may include a transceiver 102, an antenna unit 103 (e.g., the antenna unit 48 in case of UE 47, or the antenna unit 51 in case of UE 50, etc.), a processor 105, and a memory 107 (which may, in some embodiments, also include memory on UE's Subscriber Identity Module (SIM) card). The antenna unit 103 may include a single or multiple antennas. Because the UE 100 may communicate with an RBS (e.g., the eNB 56 in FIG. 3) based on the base station's scheduling of the UE, the UE 100 may be forced into DRX mode through base station's control of such scheduling as discussed earlier. In particular embodiments, some or all of the functionalities (e.g., reporting PCI and ECGI measurements for a neighboring cell, extending duration of DRX cycle when instructed by the source eNB, entering into DRX mode despite pending data transactions, etc.) described above in conjunction with a UE configured to enter into the DRX mode may be provided by the UE processor 105 executing instructions stored on a computer-readable medium, such as the memory 107 shown in FIG. 6. Alternative embodiments of the UE 100 may include additional components beyond those shown in FIG. 6 that may be responsible for enabling the UE's 100 communication with a base station (e.g., the eNB 56 in the network 54) and for providing certain aspects of the UE's functionality, including any of the functionality described above and/or any functionality necessary to support the forced DRX solution as per the teachings of the present disclosure described above.

Figure 7:
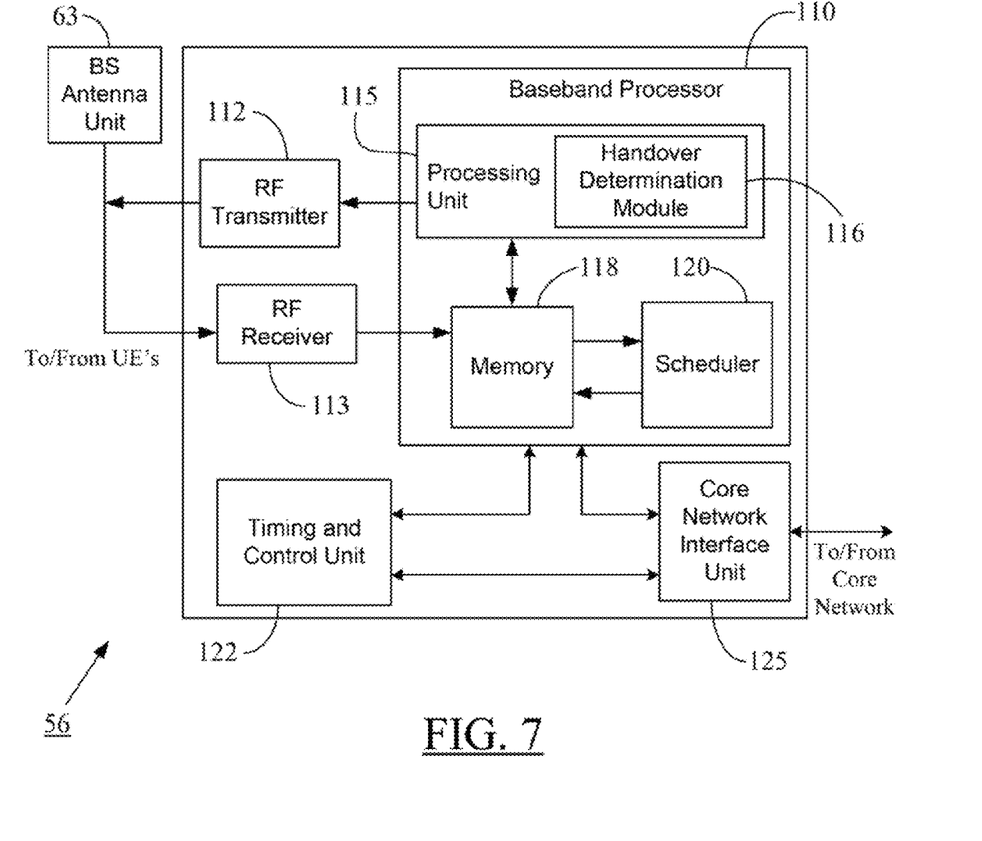
FIG. 7 is a block diagram of an exemplary eNB or a similar wireless access node (or base station) according to one embodiment of the present disclosure.

FIG. 7 is a block diagram of an exemplary eNB or a similar wireless access node (or base station) (e.g., the eNB 56) according to one embodiment of the present disclosure. The eNB 56 may be configured to force a UE (e.g., any of the UE's 47, 50 in FIG. 3) into DRX mode as per the flowcharts in FIGS. 4-5. The eNB 56 may include a baseband processor 110 to provide radio interface with the mobile handsets (e.g., UEs 47, 50 in the carrier network 54 in FIG. 3) via eNB's Radio Frequency (RF) transmitter 112 and RF receiver 113 units coupled to the eNB's antenna unit 63. In one embodiment, the processor 110 may receive transmissions (e.g., UL signals, neighboring cell measurement reports including neighboring cell's PCI, ECGI, etc.) from the UEs (e.g., UEs 47, 50 in FIG. 3) via the combination of the antenna unit 63 and the receiver 113, whereas eNB's transmissions (e.g., scheduling instructions, handover information, etc.) to the UEs (e.g., UEs 47, 50 in FIG. 3) may be carried out via the combination of the antenna unit 63 and the transmitter 112. The processor 110 may be configured (in hardware and/or software) to perform controlled scheduling of a UE (e.g., the UE 50 in FIG. 3) to force the UE into DRX mode as per the teachings of the present disclosure. In that regard, the processor 110 may include a processing unit 115 having a handover (HO) determination module 116 to perform forced DRX during ANR as per the teachings of the present disclosure. In one embodiment, the HO determination module 116 may be a separate unit coupled to the processing unit 115 and/or the RF transmitter 112 and receiver 113 to receive various (neighboring cell) measurement reports from the UEs and to perform HO-related transmissions to UEs. In another embodiment, various neighbor list creation (through ANR) and forced DRX aspects discussed earlier with reference to exemplary FIGS. 4-5 may be implemented using the module 116 in combination with the processing unit 115, the RF transmitter 112, the RF receiver 113, the antenna unit 63, the scheduler 120 (discussed later below) and the memory 118 (which may be part of the processor 110 as well). For example, the module 116 may receive initial neighbor cell PCI measurements from a UE, order the UE to read ECGI for the target cell, determine UE's load status (e.g., high volume data transactions pending at the UE or not), also determine whether the UE is in motion and its retransmission rate, whether the UE should be forced into DRX mode, etc. The HO determination module 116 may also create (if not already created/stored) a neighbor list (not shown) in the memory 116 and may then initiate the ANR procedure to build or maintain the neighbor list based on measurement reports received from the UE. The HO determination module 116 may also decide whether and when to handover the UE to a specific target cell, and may also provide instructions to the UE for the handover. The HO determination module 116 may remain in communication with the processing unit 115. Hence, when it is determined to force the UE into DRX mode, the processing unit 115 may then instruct the scheduler 120 to not allocate any RBs (in UL, DL, or both) to the UE as per the teachings of the present disclosure. In one embodiment, either the module 116 or the processing unit 115 may extend the duration of the DRX cycle—both in the eNB 56 and the UE (e.g., the UE 50 discussed earlier)—until the ECGI measurement of a neighboring cell is completed, and may communicate such changes to DRX cycle's duration to the concerned UE via the combination of the transmitter unit 112 and the antenna unit 63. Similarly, as mentioned before, communications from UEs may be received (via the antenna unit 63 and the receiver 113) and stored in the memory 118 for further processing by the processing unit 115 and the HO determination module 116. Other arrangements to implement the functionality of the HO determination module 116 in the base station or access point 56 in FIG. 7 may be devised as well. For example, in one embodiment, the functionality of the module 116 may be implemented in an external component such as, for example, a BSC or a gateway/control node (not shown). Alternatively, all of the functionalities of the module 116 may be performed by the processing unit 115 (e.g., when the module 116 is an integral part of the processing unit 115 as shown, for example, in the embodiment of FIG. 7).

The processing unit 115 may be in communication with the memory 118 to process and store relevant information for the cell (e.g., identities of UEs operating within the cell, a neighbor list for the cell created using the ANR procedure, neighbor cell measurement reports received from UEs, etc.). A scheduler (e.g., the scheduler 120 in FIG. 7) may be part of the eNB's 56 processor 110 and may provide the scheduling decisions for UEs (e.g., UEs 47, 50 etc.) based on a number of factors such as, for example, QoS (Quality of Service) parameters, UE buffer status, uplink channel feedback report received from UEs, UE capabilities, etc. The scheduler 120 may have the same data structure as a typical scheduler in an eNB in an LTE system. The processor 110 may also provide additional baseband signal processing (e.g., mobile device registration, channel signal information transmission, radio resource management, etc.) as required. The processing unit 115 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described above (e.g., reception of PCI and ECGI measurements for a neighboring cell using module 116; control of the scheduler 120 to force a UE into DRX mode, transmission of information related to handover using antennas in the antenna unit 63 and RF transmitter 112; storage of neighbor cell list and neighbor cell measurement values in the memory 118 of the processor 110; etc.) as being provided by a base station or another entity having similar functionality (such as a wireless access node/point, a mobile base station, a base station controller, a node B, an enhanced node B, and/or any other type of mobile communications node) may be provided by the processing unit 115 (with processing support from the module 116, as needed) executing instructions stored on a computer-readable data storage medium, such as the memory 118 shown in FIG. 7.

The eNB 56 may further include a timing and control unit 122 and a core network interface unit 125 as illustrated in FIG. 7. The control unit 122 may monitor operations of the processor 110 and the network interface unit 125, and may provide appropriate timing and control signals to these units. The interface unit 125 may provide a bi-directional interface for the eNB 56 to communicate with its core network (e.g., the core network 61 in the embodiment of FIG. 3) to facilitate administrative and call-management functions for mobile subscribers operating in the corresponding carrier network (e.g., the carrier network 54 in FIG. 3) through eNB 56.

Alternative embodiments of the base station 56 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. Some or all aspects of the methodology provided herein (related to forced DRX in a UE) may be implemented in a computer program, software, or firmware incorporated in a computer-readable storage medium (e.g., the memory 107 in FIG. 6 or the memory 118 in FIG. 7) for execution by a general purpose computer or a processor (e.g., the processor 105 in FIG. 6 or the processing unit 115 in FIG. 7). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs).

The foregoing describes a method and mechanism to use a serving eNB to force a UE (being served by that eNB) into DRX mode despite pending data transactions at the UE. This results in efficient and timely reading of CGI/ECGI of neighboring cells, thereby facilitating entry of a target cell into the serving cell's neighbor list via ANR without undue delay and also facilitating subsequent handover (if needed) to that target cell. The serving eNB may instruct its scheduler to not allocate any RBs to the UE (especially when the UE has high volume of pending data transactions and/or when the UE is in motion and its retransmission rate is beyond a specific threshold) such that the UE automatically goes into the DRX mode. This allows the UE to successfully and timely read the CGI/ECGI of neighboring cell(s), which can then be added to the neighbor list of the UE's serving cell via ANR procedures. In one embodiment, the serving eNB may also optionally extend the duration of the DRX cycle to a long enough period until ECGI measurements from the UE are received.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of updating a neighbor list at a serving cell in a wireless system, wherein an evolved Node B (eNB) in the wireless system provides Radio Frequency (RF) coverage to a User Equipment (UE) associated with the serving cell, and wherein the method comprises performing the following steps using the eNB:
   instructing the UE to report an identifier of a neighboring cell in the wireless system from which RF signals are also received by the UE;
   forcing the UE to enter into a Discontinuous Reception (DRX) mode despite pending data transactions at the UE that are preventing the UE from automatically entering the DRX mode, thereby facilitating the UE's timely reading of the identifier of the neighboring cell, wherein the step of forcing the UE to enter into the DRX mode includes the steps of:
      upon instructing the UE to report the identifier of the neighboring cell, determining the volume of data remaining to be transmitted to the UE or received from the UE; and
      when the volume of data is above a pre-determined threshold and is preventing the UE from automatically entering the DRX mode, forcing the UE to enter into the DRX mode;
   receiving the identifier of the neighboring cell from the UE; and
   adding the neighboring cell to the neighbor list of the serving cell.

2. The method of claim 1, wherein when the volume of data is above the pre-determined threshold and is preventing the UE from automatically entering the DRX mode, the step of forcing the UE to enter into the DRX mode includes the step of:
    preventing allocation of Resource Blocks (RBs) to the UE in at least one of the following directions in response to instructing the UE to report the identifier of the neighboring cell:
    Uplink (UL) direction; and
    Downlink (DL) direction.

3. The method of claim 2, wherein the step of preventing allocation of RBs to the UE includes:
    preventing allocation of RBs to the UE until the identifier of the neighboring cell is received from the UE.

4. The method of claim 1, wherein when the volume of data is above a pre-determined threshold and is preventing the UE from automatically entering the DRX mode, the step of forcing the UE to enter into the DRX mode includes the step of:
    instructing a scheduler in the eNB to not schedule the UE for at least one of the following data transactions pending at the UE until the identifier of the neighboring cells is received from the UE:
    Uplink (UL) transmissions; and
    Downlink (DL) receptions.

5. The method of claim 1, wherein when the volume of data is above a pre-determined threshold and is preventing the UE from automatically entering the DRX mode, the step of forcing the UE to enter into the DRX mode includes the steps of:
    determining whether the UE is in motion;
    further determining whether a retransmission rate for data transactions pending at the UE is above a first pre-determined threshold; and
    forcing the UE to enter into the DRX mode when the UE is determined to be in motion and when the retransmission rate is determined to be above the first pre-determined threshold and is preventing the UE from automatically entering the DRX mode.

6. The method of claim 5, wherein the step of forcing the UE to enter into the DRX mode includes the following when the UE is determined to be in motion and when the retransmission rate is determined to be above the first pre-determined threshold:
    forcing the UE to enter into the DRX mode only when the strength of the RF signals received by the UE from the neighboring cell is above a second pre-determined threshold.

7. The method of claim 1, wherein when the volume of data is above a pre-determined threshold and is preventing the UE from automatically entering the DRX mode, the step of forcing the UE to enter into the DRX mode includes the step of:
    extending the duration of the DRX mode in the UE as well as in the eNB until the identifier of the neighboring cell is received from the UE.

8. A mobile communication node that is part of a wireless system, the mobile communication node comprising:
    a processing unit coupled to a memory that stores computer program instructions, wherein when the processing unit executes the computer program instructions, the mobile communication node is caused to:
    provide Radio Frequency (RF) coverage over a serving cell associated therewith;
    further provide RF coverage to a User Equipment (UE) associated with the serving cell in the wireless system;
    instruct the UE to report a Cell Global Identity (CGI) of a neighboring cell in the wireless system from which RF signals are also received by the UE;
    force the UE to enter into a Discontinuous Reception (DRX) mode despite pending data transactions at the UE that are preventing the UE from automatically entering the DRX mode, wherein the mobile communication node is configured to perform the following as part of forcing the UE to enter into the DRX mode:
    determine the volume of data remaining to be transmitted to the UE or received from the UE; and
    when the volume of data is above a pre-determined threshold and is preventing the UE from automatically entering the DRX mode, force the UE to enter into the DRX mode;
    receive the identifier of the neighboring cell from the UE; and
    add the neighboring cell to the neighbor list of the serving cell.

9. The mobile communication node of claim 8, wherein when the volume of data is above a pre-determined threshold and is preventing the UE from automatically entering the DRX mode, the mobile communication node is configured to perform the following to force the UE to enter into the DRX mode:
    prevent allocation of Resource Blocks (RBs) to the UE in at least one of the following directions in response to instructing the UE to report the identifier of the neighboring cell:
    Uplink (UL) direction; and
    Downlink (DL) direction.

10. The mobile communication node of claim 9, wherein the mobile communication node is configured to prevent allocation of RBs to the UE until the identifier of the neighboring cell is received from the UE.

11. The mobile communication node of claim 9, wherein the mobile communication node is configured to prevent allocation of RBs to the UE by:
    instructing a scheduler in the mobile communication node to not schedule the UE for at least one of the following data transactions pending at the UE:
    Uplink (UL) transmissions; and
    Downlink (DL) receptions.

12. The mobile communication node of claim 8, wherein when the volume of data is above a pre-determined threshold and is preventing the UE from automatically entering the DRX mode, the mobile communication node is configured to perform the following as part of forcing the UE to enter into the DRX mode:
    determine whether the UE is in motion;
    further determine whether a retransmission rate for data transactions pending at the UE is above a first pre-determined threshold; and
    force the UE to enter into the DRX mode when the UE is determined to be in motion and when the retransmission rate is determined to be above the first pre-determined threshold and is preventing the UE from automatically entering the DRX mode.

13. The mobile communication node of claim 12, wherein when the volume of data is above a pre-determined threshold and is preventing the UE from automatically entering the DRX mode, the mobile communication node is further configured to perform the following as part of forcing the UE to enter into the DRX mode when the UE is determined to be in motion and when the retransmission rate is determined to be above the first pre-determined threshold:
    force the UE to enter into the DRX mode only when the strength of the RF signals received by the UE from the neighboring cell is above a second pre-determined threshold.

14. The mobile communication node of claim 8, wherein when the volume of data is above a pre-determined threshold and is preventing the UE from automatically entering the DRX mode, the mobile communication node is configured to perform the following as part of forcing the UE to enter into the DRX mode:
  extend the duration of the DRX mode in the UE as well as in the mobile communication node until the identifier of the neighboring cell is received from the UE.

15. In a method of updating a neighbor list at a serving cell in a wireless system via an Automatic Neighbor Relation (ANR) procedure in which a User Equipment (UE) associated with the serving cell is instructed by a Base Station (BS) of the serving cell to report an identifier of a neighboring cell in the wireless system to facilitate addition of the neighboring cell to the neighbor list of the serving cell, an improvement comprising the step of:
  configuring the BS to force the UE to enter into a Discontinuous Reception (DRX) mode despite pending data transactions at the UE that are preventing the UE from automatically entering the DRX mode, thereby facilitating UE's timely reading of the identifier of the neighboring cell, wherein the BS forces the UE to enter into the DRX mode by performing the steps of:
  upon instructing the UE to report the CGI of the neighboring cell, determining the volume of data remaining to be transmitted to the UE or received from the UE; and
  when the volume of data is above a pre-determined threshold and is preventing the UE from automatically entering the DRX mode, forcing the UE to enter into the DRX mode;
  receiving the identifier of the neighboring cell from the UE; and
  adding the neighboring cell to the neighbor list of the serving cell.

16. The method of claim 15, wherein the improvement further comprises:
  configuring the BS to prevent allocation of Resource Blocks (RBs) to the UE in at least one of the following directions in response to instructing the UE to report the identifier of the neighboring cell:
  Uplink (UL) direction; and
  Downlink (DL) direction.

17. A wireless system comprising:
  an evolved Node B (eNB) that includes a processing unit coupled to a memory that stores computer program instructions, wherein when the processing unit executes the computer program instructions, the eNB is caused to perform the following:
  provide Radio Frequency (RF) coverage over a serving cell associated with the eNB,
  further provide RF coverage to a User Equipment (UE) associated with the serving cell in the wireless system,
  instruct the UE to report an Extended Cell Global Identity (ECGI) of a neighboring cell in the wireless system from which RF signals are also received by the UE,
  prevent allocation of Resource Blocks (RBs) to the UE in the Uplink (UL) and/or Downlink (DL) in response to instructing the UE to report the ECGI of the neighboring cell, thereby forcing the UE to enter into a Discontinuous Reception (DRX) mode despite pending data transactions at the UE that are preventing the UE from automatically entering the DRX mode, wherein the eNB is further configured to prevent allocation of RBs to the UE when at least one of the following applies:
    when the volume of data remaining to be transmitted to the UE or received from the UE is above a first pre-determined threshold; and
    when the UE is in motion and when a retransmission rate for data transactions pending at the UE is above a second pre-determined threshold;
  receive the ECGI of the neighboring cell from the UE, and
  add the neighboring cell to the neighbor list of the serving cell; and
the UE that is in communication with the eNB, wherein the UE includes a UE processor coupled to a memory that stores computer program instructions, wherein when the processing unit executes the computer program instructions, the UE is caused to perform the following:
  in response to a lack of allocation of RBs to the UE in the UL and/or DL, enter into the DRX mode despite pending data transactions at the UE that are preventing the UE from automatically entering the DRX mode,
  read the ECGI of the neighboring cell while in the DRX mode, and
  report the ECGI of the neighboring cell to the eNB.

* * * * *